(12) United States Patent
Iwane et al.

(10) Patent No.: US 8,364,450 B2
(45) Date of Patent: Jan. 29, 2013

(54) MULTI-OBJECTIVE OPTIMIZATION DESIGN SUPPORT APPARATUS AND METHOD

(75) Inventors: Hidenao Iwane, Kawasaki (JP); Hirokazu Anai, Kawasaki (JP); Hitoshi Yanami, Kawasaki (JP)

(73) Assignee: Fujitsu Limited, Kawasaki-Shi (JP)

(*) Notice: Subject to any disclaimer, the term of this patent is extended or adjusted under 35 U.S.C. 154(b) by 283 days.

(21) Appl. No.: 12/838,903

(22) Filed: Jul. 19, 2010

(65) Prior Publication Data

US 2011/0022365 A1 Jan. 27, 2011

(30) Foreign Application Priority Data

Jul. 24, 2009 (JP) ................................. 2009-173440

(51) Int. Cl.
*G06F 7/60* (2006.01)
*G06F 17/10* (2006.01)
(52) U.S. Cl. .......................................... 703/2
(58) Field of Classification Search .......... 703/2, 13–14; 716/50–56, 106, 111, 136
See application file for complete search history.

(56) References Cited

U.S. PATENT DOCUMENTS

| | | | |
|---|---|---|---|
| 5,966,312 A * | 10/1999 | Chen | 703/6 |
| 7,243,320 B2 * | 7/2007 | Chiu et al. | 716/106 |
| 7,574,334 B2 * | 8/2009 | Tiwari et al. | 703/2 |
| 7,630,852 B1 * | 12/2009 | Ghanta et al. | 702/117 |
| 8,181,141 B2 * | 5/2012 | Nitta | 716/122 |
| 2007/0042512 A1 * | 2/2007 | Kawabata | 438/14 |
| 2010/0205574 A1 * | 8/2010 | Anai et al. | 716/5 |
| 2011/0184706 A1 * | 7/2011 | Iwane et al. | 703/2 |
| 2011/0295573 A1 * | 12/2011 | Iwane et al. | 703/2 |

FOREIGN PATENT DOCUMENTS

JP 2005-258740 9/2005
JP 2010-122832 6/2010

OTHER PUBLICATIONS

Dolzmann et al., Real Quantifier Elimination in Practice, 1998, In B.H. Matzat, G.-M. Greuel, and G. Hiss, editor, Algorithm Algebra and Number of Theory, pp. 221-247.*
Hirokazu Anai, et al., "Introduction to Computational Real Algebraic Geometry", Mathematical Seminar 11, 2007, pp. 64-70.
George E. Collins, et al., "Partial Cylindrical Algebraic Decomposition for Quantifier Elimination", Journal of Symbolic Computation, vol. 12, No. 3, 1991.

* cited by examiner

*Primary Examiner* — Mary C Jacob
*Assistant Examiner* — Aniss Chad
(74) *Attorney, Agent, or Firm* — Staas & Halsey LLP

(57) ABSTRACT

An embodiment relates to a multi-objective optimization design supporting technique to reduces the computational complexity of QE/CAD. When the input logical expression generated by a logical-expression-with-qualifier generation unit is satisfied in regard to the sample point included in a certain piece of cell information for each value of the same design parameter, a first cell processing unit does not evaluate the input logical expression on the cell information including other sample points having a value equal to or smaller than the value of a predetermined design variable (for example, a design variable indicating a yield) corresponding to the sample point above, but selects it as the cell information for an output of a logical expression without a qualifier.

6 Claims, 10 Drawing Sheets

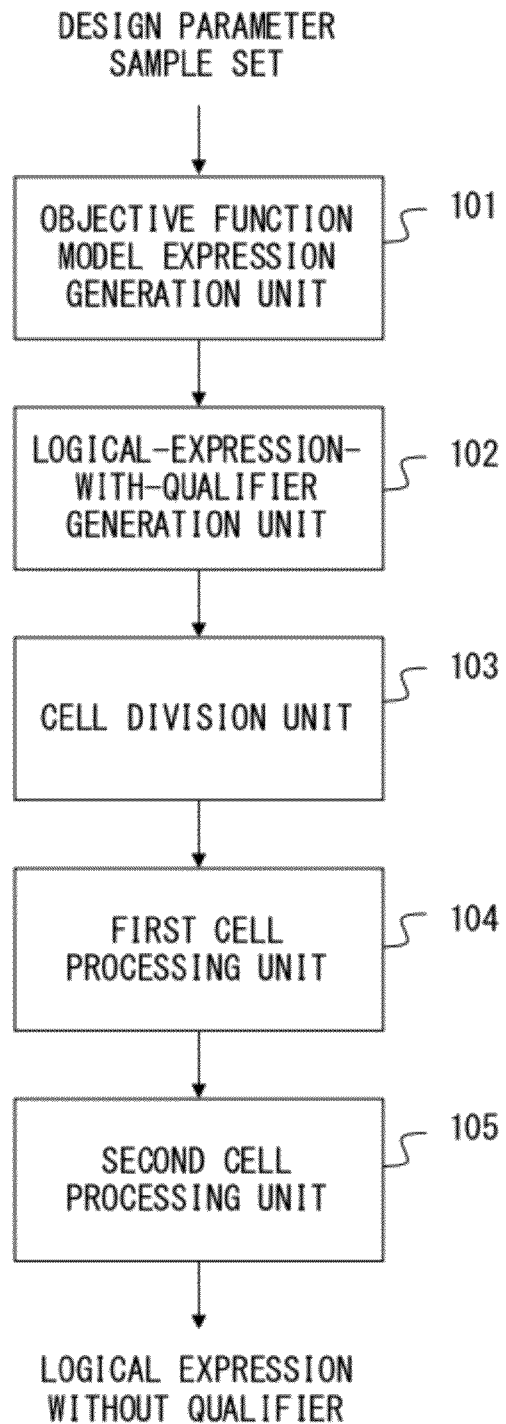
F I G. 1

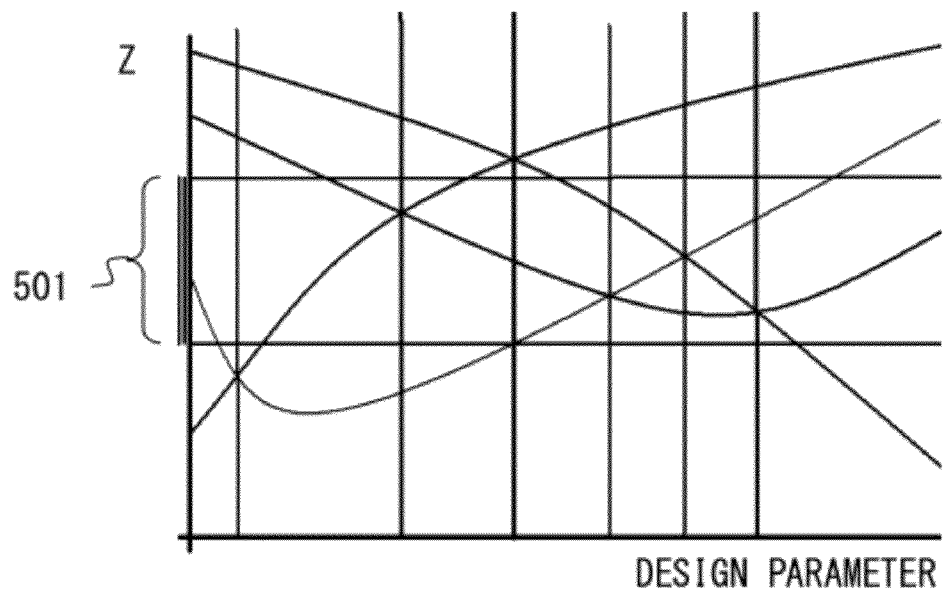
F I G. 5

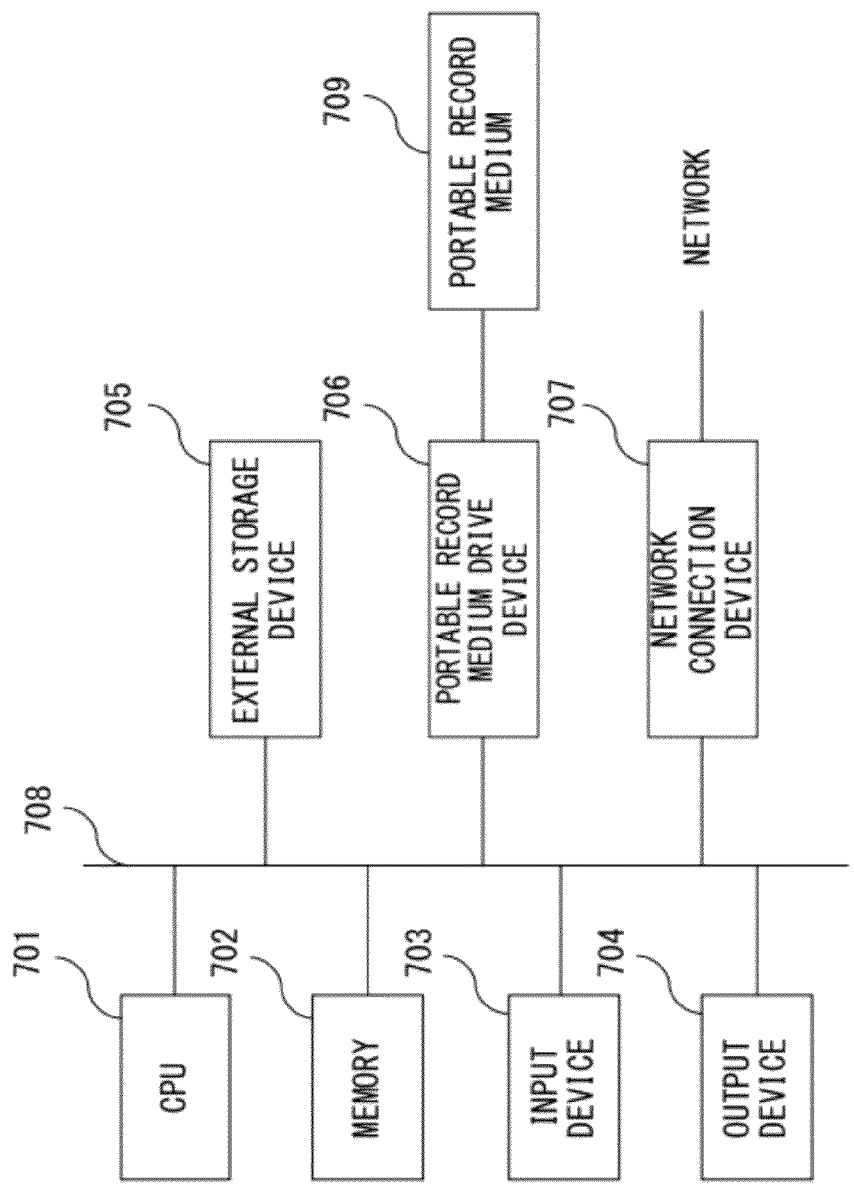
F I G. 7

MULTI-OBJECTIVE OPTIMIZATION DESIGN SUPPORT APPARATUS AND METHOD

CROSS-REFERENCE TO RELATED APPLICATIONS

This application is based upon and claims the benefit of priority of the prior Japanese Patent Application No. 2009-173440, filed on Jul. 24, 2009, the entire contents of which are incorporated herein by reference.

FIELD

The present invention relates to multi-objective optimization design support technology used for design.

BACKGROUND

At the design stage in producing an object, it is necessary to represent a design condition as a function (objective function) of a design parameter, and to set (optimize) a design parameter so that the output value of the objective function (=objective function value) can be a desired value. In this case, the designer first determines a shape, then sets a range for the value of each design parameter and performs optimization in a design parameter space.

However, when there are a large number of design parameters, searching the entirety of the space incurs a combination explosion, and an optimizing calculation cannot be performed in real time.

Assume that SRAM (static random access memory) is designed as an example in producing an object.

A design target in designing SRAM is to guarantee both "allowance of operation stability against disturbance" and "allowance of write stability". The performance of the former is called a static noise margin (hereinafter referred to as an SNM for short). The SNM is defined as the maximum value of the noise amplitude allowed for the operation of the SRAM. The larger the value of the SNM, the higher the stability. The performance of the latter is called a write margin (hereinafter referred to as a WM for short) and a hold noise margin (hereinafter referred to as an HNM for short). The larger the values of the WM and the HNM, the higher the stability.

The SNM and the WM or the WM and the HNM typically offset each other and then have a property wherein when one value is increased, the other value is decreased.

In designing the SRAM, the multi-objective optimization for simultaneously maximizing two physical amounts, that is, the SNM and the WM, or the three physical amounts, that is, the SNM, the WM, and the HNM, is required for the following design parameters of the SRAM.

<Design Parameters of SRAM>
  cell voltage
  load gate length
  driver gate length
  transfer gate length
  load width
  driver width
  transfer width
  Wl (word line potential) control variable
  Vth (amount of Vth change) of load
  Vth (amount of Vth change) of driver
  Vth (amount of Vth change) of transfer For example, in the case of the SNM and the WM, there is a general tendency to increase the yield of the SRAM, that is, to have larger values of the SNM and the WM, when larger sizes (of a gate length and width in the example above) represented by L1, L2, W1, W2, etc., and higher cell voltages and the like are obtained in an SRAM shape 801 illustrated in FIG. 8.

In this case, the optimization problem of maximizing the yield simultaneously for the SNM and the WM is the problem of simultaneously maximizing the objective function value representing the SNM and the objective function value representing the WM. That is, the simultaneous optimization problem of the yields corresponding to the SNM and the WM is to perform a calculation by the following equation to obtain the maximum value.

$$\text{Yield} = \min(\text{objective function of SNM}, \text{objective function of WM}) \quad \text{equation (1)}$$

The objective function of the SNM, the WM, etc. can typically be numerically-calculated by a simulator using a design parameter group configured by predetermined types of design parameters. Therefore, numerical calculations are performed by equation (1) above on the set of design parameters of a number of sets of samples, and a set of design parameter groups of simultaneously maximizing an obtained objective function value of the SNM and an obtained objective function value of the WM can be recognized, thereby attaining the objective of the design.

However, the objective functions such as the SNM, the WM, etc. in the SRAM generally require complicated functional calculations performed by inputting design parameter groups configured by a number of types of design parameters. Therefore, when a numerical calculation using equation (1) is performed while changing the value of each design parameter between 0 and 1, outstanding computational complexity is required to calculate the optimum set of design parameters for simultaneously maximizing the objective function values, and it is significantly difficult to perform optimization in real time.

Under these circumstances, the following solution using a mathematical model expression of an objective function is known as a prior art for efficiently solving the above-mentioned multi-objective optimization problem in designs for producing an object such as SRAM.

First, a plurality of sets of samples of plural types of design parameter groups are prepared. It is not necessary to prepare a very large number of sets of samples.

Next, in a design simulator, a simulator calculation is performed on the plurality of sets of samples, and a numerical calculation is performed for the objective functions of the SNM and the objective function of the WM corresponding to each set of samples. Although two or three minutes are required to perform a numerical calculation of each objective function on a design parameter group of one sample, the calculating process is not a difficult process because there is not a very large number of set of samples.

Next, an approximating process by, for example, a method of least squares is performed on a plurality of sets of samples of pairs an objective function value of the SNM objective function value of the WM, and a design parameter group. As a result, each objective function model expression exemplified by the following equation is calculated after performing a mathematical approximation by a polynomial including each design parameter on the objective function of the SNM and the objective function of the WM.

$$\begin{aligned}f1 =\ & -3.70880619227755703- \\ & 1.815535443549214242e{-}2*x1+0.362756 \\ & 928799239723e{-}1*x2+ \\ & 0.529879430721035828e{-}1*x3-0.18618740718 \\ & 0227748e{-}1*x4+0.378882808207316458e{-} \\ & 1*x5+0.5772189118800075\,30e{-}2*x6+ \\ & 15.4475497344388622*x7+ \\ & 7.61316609791377275*x8+11.1 \\ & 015094199909559*x9+ \\ & 11.1015094199909399*x10-1.84551068765900 \\ & 172*x11 \quad \text{equation (2)}\end{aligned}$$

Generally, each objective function model expression of the SNM and the WM can be represented by the following equations. In the following equation, f1 and f2 are functions of a polynomial relating to, for example, design parameter $x1, \ldots, x11$.

objective function model expression of SNM=
$f1(x1, \ldots, x11)$ objective function model expression of WM=
$f2(x1, \ldots, x11)$. equation (3)

In the prior art, each objective function model expression having practical approximation accuracy can be obtained using a smaller number of sets of samples of design parameter groups. In such a model expression, an objective function portion other than a sample value can be smoothly approximated only by selecting a sample value of a small number of design parameter groups, and an objective function model expression having a practically sufficient accuracy can be obtained.

Next, a logical expression obtained by adding a restriction condition and a quantifier (or a qualifier) on the design parameter included in the model equation to the calculated objective function model expression is generated.

For example, assume that, as an operation example 1, a designer requests the simultaneous maximum values for yields using the objective function model expressions f1 and f2 illustrated by equation (3).

In this case, the restriction condition is set as follows using equations (1) and (3) above.

objective function model expression of SNM=
$f1(x1, \ldots, x11)$ objective function model expression of WM=
$f2(x1, \ldots, x11)$ yield=min(f1, f2)

$0 \leq xi \leq 1 (i=1, 2, \ldots, 11)$

The above-mentioned restriction condition can be represented as a logical expression using the following equation.

$ex(\{x1,x2,x3,x4,x5,x6,x7,x8,x9,x10,x11\}, (0 \leq x1 \leq 1)$
and $(0 \leq x2 \leq 1)$ and $(0 \leq x3 \leq 1)$ and $(0 \leq x4 \leq 1)$
and $(0 \leq x5 \leq 1)$ and $(0 \leq x6 \leq 1)$ and $(0 \leq x7 \leq 1)$
and $(0 \leq x8 \leq 1)$ and $(0 \leq x9 \leq 1)$ and $(0 \leq x10 \leq 1)$
and $(0 \leq x11 \leq 1)$ and $f1 \geq z$ and $f2 \geq z$); equation (4)

In equation (4) above, ex indicates exists, and that an existence qualifier is added to the design parameter (=design variable) x1 through x11. That is, in equation (4) above, the following values are set.

∃x1, ∃x2, ∃x3, ∃x4, ∃x5, ∃x6, ∃x7, ∃x8, ∃x9, ∃x10, ∃x11

In equation (4) above, each design parameter xi can be a value larger than 0 and smaller than 1. f1 and f2 in equation (4) are objective function model expressions equivalent to f1 and f2 in equation (3), and are represented as a polynomial of x1 through x11. z is a design variable indicating a yield.

For example, from the logical expression in equation (4) above, using the QE (quantifier elimination) method, which is well known due to its disclosure in the non-patent document "Introduction to Computational Algebraic and Geometry: Outline of CAD and QE (Mathematic Seminar, No. 11 2007 page 64-70 (by Hirokazu Anai and Kazuhiro Yokoyama))" and the non-patent document "Partial Cylindrical Algebraic Decomposition for Quantifier Elimination" by George E. Collins and Hoon Hong, Journal of Symbolic Computation, Volume 12, Number 3, 1991, pp. 299-328, the process of eliminating the design variable (=design parameter) x1 through x11 provided with qualifiers is performed. As a result, a logical expression indicating only the range of the design variable z can be obtained, and the designer can easily predict the maximum value of the design variable z.

Next, as an operation example 2 according to the prior art, it is assumed that a designer has requested the information of the relationship between a yield and a specific design parameter x1 using the objective function model expressions f1 and f2 described in equation (3).

In this case, the logical expression of the following equation is set.

$ex(\{x2, x3, x4, x5, x6, x7, x8, x9, x10, x11\}, $
$(0 \leq x1 \leq 1)$ and $(0 \leq x2 \leq 1)$ and $(0 \leq x3 \leq 1)$ and
$(0 \leq x4 \leq 1)$ and $(0 \leq x5 \leq 1)$ and $(0 \leq x6 \leq 1)$ and
$(0 \leq x7 \leq 1)$ and $(0 \leq x8 \leq 1)$ and $(0 \leq x9 \leq 1)$ and
$(0 \leq x10 \leq 1)$ and $(0 \leq x11 \leq 1)$ and $f1 \geq z$ and
$f2 \geq z$). equation (5)

In this equation, a qualifier is set in all design parameters except x1.

In this case, the process of eliminating the design variables (=design parameters) x2 through x11 provided with qualifiers is performed by using the QE method from the logical expression of equation (5) above. As a result, a logical expression configured by just the design parameter x1 and the design variable z indicating a yield can be obtained.

As described above, after obtaining the logical expression including only the specific design variable (design parameter), for example in the case of the operation example 2 above, a design parameter remaining in the obtained logical expression, for example a sample point group $(0 \leq x1 \leq 1)$ relating to x1, is generated. Then, by calculating the logical expression above for each sample point, a possible value for the design variable z, that is, a possible area of the design variable z, is calculated. From the above-mentioned sample point and the corresponding value of z, a plot is generated on the 2-dimensional coordinates using x1 and z as axes, thereby drawing the possible area of z on the display or the like.

Thus, the designer can easily predict the relationship between the design parameter x1 and the design variable z corresponding to the yield.

As a practical calculating method for eliminating a design variable (=design parameter) provided with a qualifier in a logical expression by the QE method, a method called a CAD (Cylindrical Algebraic Decomposition) described in the non-patent document "Partial Cylindrical Algebraic Decomposition for Quantifier Elimination", by George E. Collins and Hoon Hong, Journal of Symbolic Computation, Volume 12, Number 3, 1991, pp. 299-328 is well known.

The logical expression of a multi-objective optimization problem relating to the above-mentioned SNM and WM. is generalized by the following equation as described below.

$ex(\{x1, \ldots, xt\}, (0 \leq x1 \leq 1)$ and $\ldots$ and $(0 \leq xt \leq 1)$
and $(0 \leq xt+1 \leq 1)$ and $\ldots$ and $(0 \leq xk \leq 1)$ and
$f1 \geq z$ and $f2 \geq z$);

objective function model expression of SNM=
$f1(x1, \ldots, xt, xt+1, \ldots, xk)$ objective function model expression of WM=
$f2(x1, \ldots, xt, xt+1, \ldots, xk)$. equation (6)

In the logical expression, a qualifier is provided for the design parameters x1 through xt, and no qualifier is provided for xt+1 through xk.

The multi-objective optimization problem under the above-mentioned assumption is to calculate the logical expression including only the design parameters xt+1 through xk without a qualifier by eliminating the design parameters x1 through xt provided with a qualifier from the input logical expression and the design variable z indicating the yield, and to obtain a set of design parameters xt+1 through xk without a qualifier that simultaneously maximize the design variable z using the logical expression. Assume that the design parameters x1 through xt with a qualifier have been eliminated using the QE/CAD method from the input logical expression. Then, as illustrated in FIG. 9, one of the design parameters xt+1 through xk is set as an axis of abscissas, and the design variable z is set as an axis of ordinates. With these settings, some polynomial curves relating to an objective function are obtained by projecting the objective functions f1 and f2 on the coordinate plane of FIG. 9. In the curves, the designer can recognize that selecting the set of the values of the design parameters xt+1 through xk corresponding to the point indicated by the arrow in FIG. 9 providing the maximum value of z while selecting the curve having the minimum value for z for each design parameter value is the optimum solution. The optimum solution indicates that the SNM and the WM can be simultaneously maximized in the accuracy range of the yield requested as the design specification when a set of values of the corresponding design parameters xt+1 through xk are selected. In FIG. 9, the blackened portion indicates an area which is inferior in yield to the optimum solution, but can which be selected as a set of the values of the design parameters xt+1 through xk. The area is called a possible area. On the other hand, the area not blackened above the possible area cannot be selected as a set of the values of the design parameters xt+1 through xk.

In this case, in the QE/CAD method, the following process is performed.

First, the design variable space indicated by the input logical expression configured by the design variable z and the design parameters xt+1 through xk without a qualifier is divided into a constant code area (called a "cell") with respect to f1-z, f2-z. As viewed on the 2-dimensional plane configured by a design parameter without a qualifier and the design variable z indicating a yield, for example, each area (cell) indicated by a 0 (circle) in FIG. 10 is a constant code area with respect to f1-z, f2-z. The range of the divided cell is represented by a logical expression including an inequality using one or more of the design parameters xt+1 through xk and the design variable z. In one cell, a constant code of each objective function model expression is guaranteed for any set of each value of the design parameters xt+1 through xk and the value of the design variable z within the range. These cell divisions are performed on all combinations of sets of the design parameters xt+1 through xk without a qualifier and the design variable z. The total number of divided cells is approximately the number obtained by sequentially multiplying each design parameter by each corresponding number of divisions.

Next, for each cell divided as described above, the design parameters xt+1 through xk representing the cell and the value of the design variable z (called a "sample point") are determined. These values are substituted for equation (6), including the design parameters x1 through xt provided with a qualifier, thereby determining whether or not the sample point satisfies equation (6). If equation (6) is satisfied, a logical expression using one or more of the design parameters xt+1 through xk without a qualifier and the design variable z which correspond to the cell is stored.

The logical expression obtained by combining the stored logical expressions after performing the above-mentioned determining process on all cells is calculated as a logical expression equivalent to the input logical expression and including only the design parameters xt+1 through xk without a qualifier and the design variable z.

SUMMARY

According to an aspect of an embodiment of the invention, a multi-objective optimization design support apparatus which supports a determination of a set of optimum design parameters by inputting plural sets of design parameters, calculating a plurality of objective functions using a specific calculation, and performing a multi-objective optimizing process on the plurality of objective functions, includes: an objective function model expression generation unit calculating a set of plural objective functions for a set of samples of a specific number of sets of design parameters, and generating a plurality of objective function model expressions by representing each of the objective functions as a mathematical approximation using the set of samples of the specific number of sets of the design parameters and the set of plural objective functions calculated corresponding to the set of samples; a logical-expression-with-qualifier generation unit generating an input logical expression for which a definition area of each of the design parameters, and a range restriction wherein a value of a specific design variable corresponding to a value of each of the objective functions is equal to or smaller than a minimum value of a plurality of objective function values calculated by the plurality of objective function model expressions are specified, and in which a qualifier is specified for a design parameter to be eliminated by a designer; a cell division unit dividing a design variable space formed by the specific design variable in the input logical expression and a design parameter for which no qualifier is specified into cell areas whose codes are constant with respect to a difference between each of the objective function model expression groups and the specific design variable, and storing in a list 1 a logical expression expressing the cell area via the specific design variable and a design parameter for which the qualifier is not specified and storing cell information including a value of the specific design variable corresponding to a sample point selected from the cell area and a value of a design parameter for which the qualifier is not specified; and a first cell processing unit moving from the list 1 to a list 2 cell information including a sample point in which values of design parameters for which the qualifier is not specified are the same, and then performing a calculation by substituting a sample point included in the selected cell information for the input logical expression while selecting the cell information piece by piece from the list 2, thereby evaluating whether or not the sample point satisfies the input logical expression, moving from the list 2 to a list 3 the selected cell information and cell information including a sample point having a specific design variable of a value equal to or smaller than the specific design variable corresponding to a sample point included in the selected cell information, when the input logical expression is satisfied, repeatedly performing a series of processes of eliminating from the list 2 the selected cell information and cell information including a sample point having a specific design variable of a value equal to or larger than the specific design variable corresponding to the sample point included in the selected cell information until the list 2 is empty when the input logical expression is not satisfied, and repeatedly performing a moving process from the list 1 to the list 2 each time the list 2 is empty until the list 1 is empty, wherein a logical expression obtained by combining each logical expression included in each piece of finally obtained cell information in the list 3 is output as a logical expression which is equivalent to the input logical expression and includes only a design parameter without the qualifier and the specific design variable, and design support is performed while presenting a relationship between the design parameter without the qualifier and the specific design variable using the output logical expression.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration of an embodiment of the multi-objective optimization design support apparatus of an SRAM shape parameter;

FIG. 5 is an explanatory view (2) of the operation according to an embodiment of the present invention;

FIG. 7 is a configuration of a hardware system capable of realizing an embodiment of the present invention;

DESCRIPTION OF EMBODIMENTS

In the above-mentioned conventional technology, when a design target is SRAM, a logical expression to be input can include, in addition to an objective function model expression, a function for calculating the number of parameters in design such as size (area), Vth, leak current, power source voltage, etc., from a predetermined set of design parameters.

Figure 8:
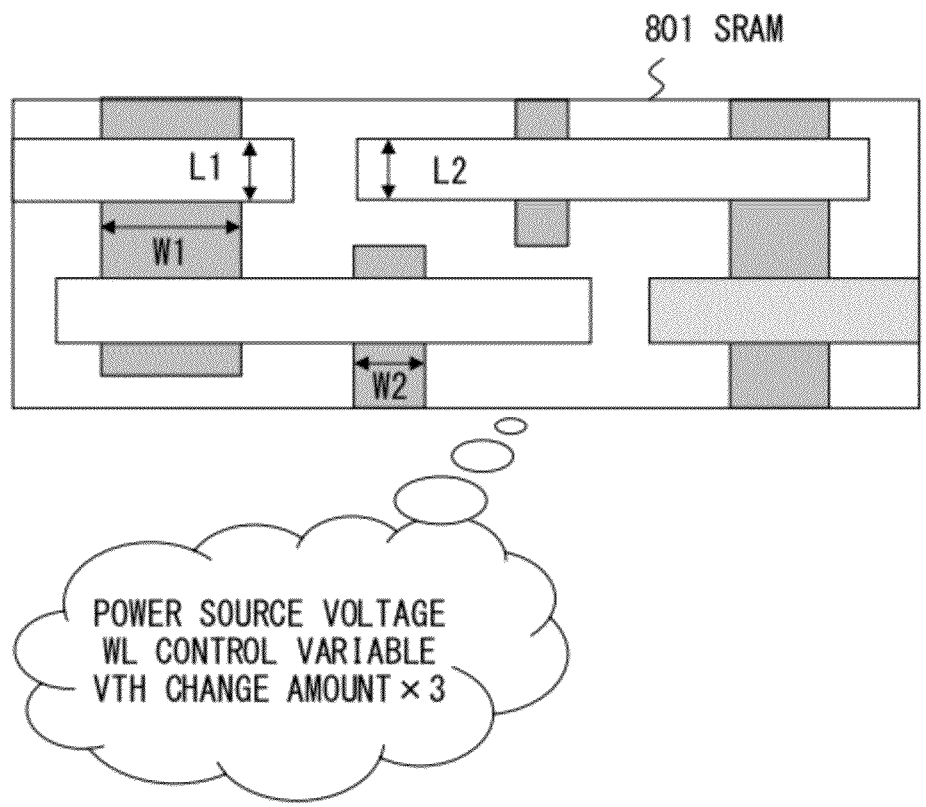
FIG. 8 is an explanatory view of a design parameter in SRAM.

The size is expressed, for example, by the function in the following equation.

$$\text{size} = (1+2 \cdot x4 + 3 \cdot x5) \cdot (6 + x2 + x3). \quad \text{equation (7)}$$

where design parameters such as x2, x3, x4, x5, etc. correspond to the? width W1, W2, ..., a? length L1, L2, ..., etc., indicating the size illustrated in FIG. 8.

Vth is represented, for example, by the following equation using a function f3 with a polynomial.

$$Vth = f3(x1, x4, x7). \quad \text{equation (8)}$$

Furthermore, the leak current Leak is represented, for example, by the following equation using an index function f4.

$$\text{Leak} = f4(x1, x4, x7). \quad \text{equation (9)}$$

In equations (8) and (9), x1, x4, x7, etc. are specific design parameters.

Equations (7) through (9) are implemented when the designer requests the information of not only the relationship between the yield and the design parameter, but also the relationship between the yield and the size, the relationship between the yield, the size, and the Vth, or the relationship between the yield, the size, and the leak current.

Assuming that, as an operation example 3, the designer requests the information of the relationship between the yield and the size, the restriction conditions are set as follows based on the above-mentioned equations (1), (6), and (7).

$$\text{objective function model expression of SNM} = f1(x1, \ldots, x5, \ldots, xt, xt+1, \ldots, xk)$$

$$\text{objective function model expression of WM} = f2(x1, \ldots, x5, \ldots, xt, xt+1, \ldots, xk)$$

$$\text{yield} = \min(f1, f2)$$

$$0 \leq xi \leq 1 \ (i=1, 2, \ldots, xk)$$

$$\text{size} = (6 + x2 + x3) \cdot (1 + 2 \cdot x4 + 3 \cdot x5)$$

The above-mentioned restriction conditions are represented by a logical expression as follows.

$$ex(\{x1, x2, x3, x4, x5, \ldots, xt\}, (0 \leq x1 \leq 1) \text{ and} \\ (0 \leq x2 \leq 1) \text{ and } (0 \leq x3 \leq 1) \text{ and } (0 \leq x4 \leq 1) \text{ and} \\ (0 \leq x5 \leq 1) \text{ and } \ldots \text{ and } (0 \leq xt \leq 1) \text{ and } (0 \leq xt+1 \leq 1) \text{ and } \ldots \text{ and } (0 \leq xk \leq 1) \text{ and } (1 + 2 \cdot x4 + 3 \cdot x5) \cdot (6 + x2 + x3) = \text{size and } f1 \geq z \text{ and } f2 \geq z); \quad \text{equation (10)}$$

Figure 10:
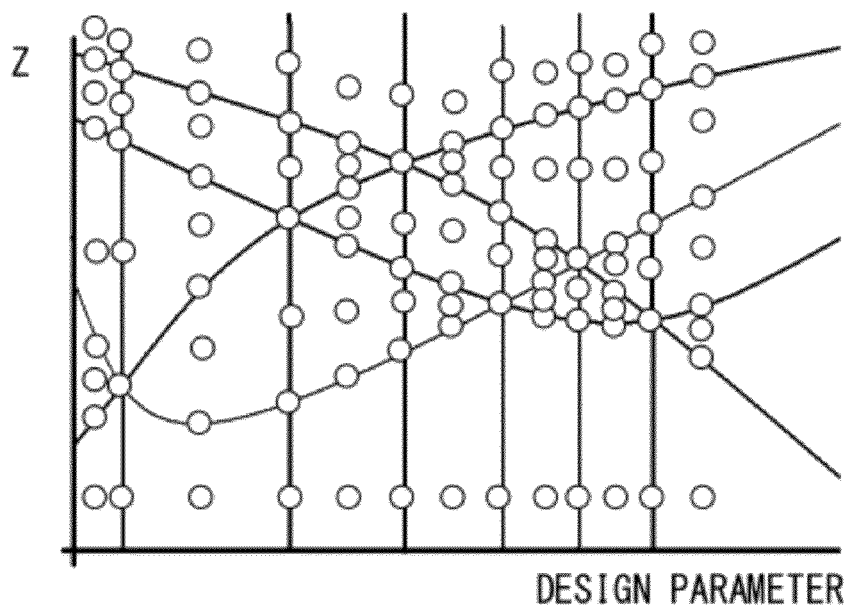
FIG. 10 is an explanatory view of a cell division in the QE/CAD method.

Assume that the process of eliminating the design variables (design parameters) x1 through xt provided with a qualifier by the QE/CAD method is to be performed on the above-mentioned logical expression. In this case, the function indicating the size in equation (10) is a quadratic equation of the design parameter. As described above, in the QE/CAD method, a cell division is performed and then the process of determining on each cell whether or not the design parameters xt+1 through xk representing the cell and the value of the design variable z representing the yield satisfy equation (10) is repeatedly performed. As described above, the number of divisions of the whole cells is obtained by sequentially multiplying each of the design parameters xt+1 through xk by each of the corresponding number of cell divisions. As illustrated in FIG. 10, the number of cells corresponding to one design parameter is several tens through hundreds. Therefore, although the number of types of design parameters without a qualifier is only three or so, the number of whole cells is several hundreds of thousands through a million or so. Then, in the QE/CAD method, it is necessary for whole cells to perform a calculation via an input logical expression, for example, equation (10) and an evaluation.

Therefore, the computational complexity is explosively enhanced in the QE/CAD method only by including a quadratic equation etc. in an input logical expression, thereby incurring the problem that there is a possibility that the calculating process of the QE/CAD will be unable to be completed in real time.

In addition, in a normal logical expression such as equation (6) without a quadratic equation or the like, since the calculating time of the QE/CAD largely affects the efficiency of a design operation, a high-speed calculation has been demanded.

The embodiment according to the present invention is described below in detail with reference to the attached drawings.

First, the basic concept of the present embodiment is described.

In the present embodiment, a logical expression to be input is assigned a design parameter value or a logical expression and its range, and when an objective function model expression is provided, the following restriction condition is regulated for the logical expression to be input.

As the first restriction condition, the range restriction insisting that the value of a predetermined variable in a logical expression (for example, the design variable z indicating a yield) be smaller (or lower) than the minimum value of a plurality of objective function values calculated by a plurality of objective function model expressions is set. For example, in SRAM. designing, the first restriction condition is determined by the worst value of the yield in the SNM and the WM (and the HNM) and is the restriction condition matching a design request requesting that a yield that simultaneously maximizes the objective function value relating to the SNM and the WM (and the HNM) be provided. In addition to the designing of SRAM, there are many design programs for which such a restriction condition is demanded.

For example, in the logical expression of a multi-objective optimization problem relating to the SNM and the WM, a restriction condition such as the following equation or the like is added.

$$z \leq f1 \text{ and } z \leq f2 \qquad \text{equation (11)}$$

In this example, the range restriction insisting that the value of the design variable z (value range) be the minimum value of the f1 and f2 or less is set.

Figure 9:
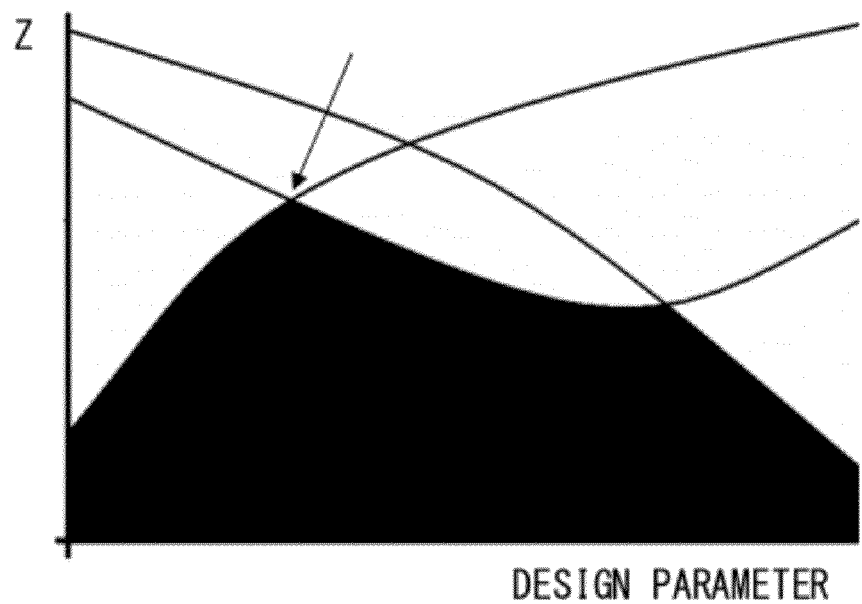
FIG. 9 is a view of the relationship between the design parameter without a qualifier and the design variable z in the QE/CAD method.

In the example of equation (11), for example, in FIG. 9, assume that one of the design parameters without a qualifier is set as an axis of the abscissas, and the design variable z indicating the yield is set as an axis of the ordinates. In this case, the area blackened below the curve providing the minimum value for z in some curves obtained by projecting an objective function model expression on the coordinate plane is an area that could function as the design variable, that is, is a possible area. The multi-objective optimization problem in the present embodiment is to find a set of the values of design parameters corresponding to a point indicated by the arrow in FIG. 9. The set of the values of the design parameters $xt+1$ through $xk$ corresponding to the point is the optimum solution capable of simultaneously maximizing the SNM and the WM within the accuracy range of the yield requested as the design specification.

The logical expression to be input with the above-mentioned first restriction condition taken into account can be defined as follows, for example.

$$ex(\{x1, \ldots, xt\}, (0 \leq x1 \leq 1) \text{ and } \ldots \text{ and } (0 \leq xt \leq 1)$$
$$\text{and } (0 \leq xt+1 \leq 1) \text{ and } \ldots \text{ and } (0 \leq xk \leq 1) \text{ and }$$
$$f1 \geq z \text{ and } f2 \geq z);$$

objective function model expression of SNM=
$$f1(x1, \ldots, xt, xt+1, \ldots xk)$$

objective function model expression of WM=
$$f2(x1, \ldots, xt, xt+1, \ldots, xk). \qquad \text{equation (12)}$$

This is the same model as equation (6) above. In the logical expression, the design parameters x1 through xt are provided with a qualifier as design variables to be eliminated, and the parameters xt+1 through xk are not provided with a qualifier as design variables to remain. Each design parameter xi ($1 \leq i \leq k$) is assigned a defined area of a value larger than 0 and smaller than 1 as a restriction condition. In addition, f1 and f2 are objective function model expressions obtained by mathematical modeling expression of each objective function relating to the SNM and the WM, and are expressed by a polynomial relating to x1 through x11. As indicated by equation (10) above, a logical expression to be input may include not only the objective function model expression as indicated by equations (7) through (9), but also the functions and the like corresponding to the number of parameters used in the design, such as the size, Vth, leak current, power source voltage, etc., from among a predetermined set of design parameters.

After the restriction condition above is added to the logical expression to be input, the QE/CAD method is applied to the input logical expression.

First, as illustrated in FIG. 10, the design variable space configured by the design variable z indicating a yield and the design parameters xt+1 through xk without a qualifier are divided into cells as constant code areas for f1-z, f2-z. As viewed on the 2-dimensional plane configured by one design parameter without a qualifier and z, each area (cell) for example, indicated by a ○ (circle) in FIG. 10 is a constant code area for f1-z, f2-z. The range of the divided cells are represented by a logical expression including an inequality or the like using one or more of the design parameters xt+1 through xk and the design variable z. In one cell, a constant code of each objective function model expression can be guaranteed for any set of values of the design parameters xt+1 through xk and the design variable z in the range. These cell divisions are performed on all combinations of design parameters xt+1 through xk without a qualifier and the design variable z. Next, for each of the divided cells, each value of the design parameters xt+1 through xk without a qualifier and a value of the design variable z are selected using any point in the cell as a sample point. Since any element of a cell has the same code, any point in a cell is selected as a sample point and is evaluated, and thereby the entire cell can be evaluated. A logical expression representing each cell and each value of the design parameters xt+1 through xk and the value of the design variable z corresponding to the sample point of each cell are stored in a list 1 as cell information for each cell.

Figure 4:
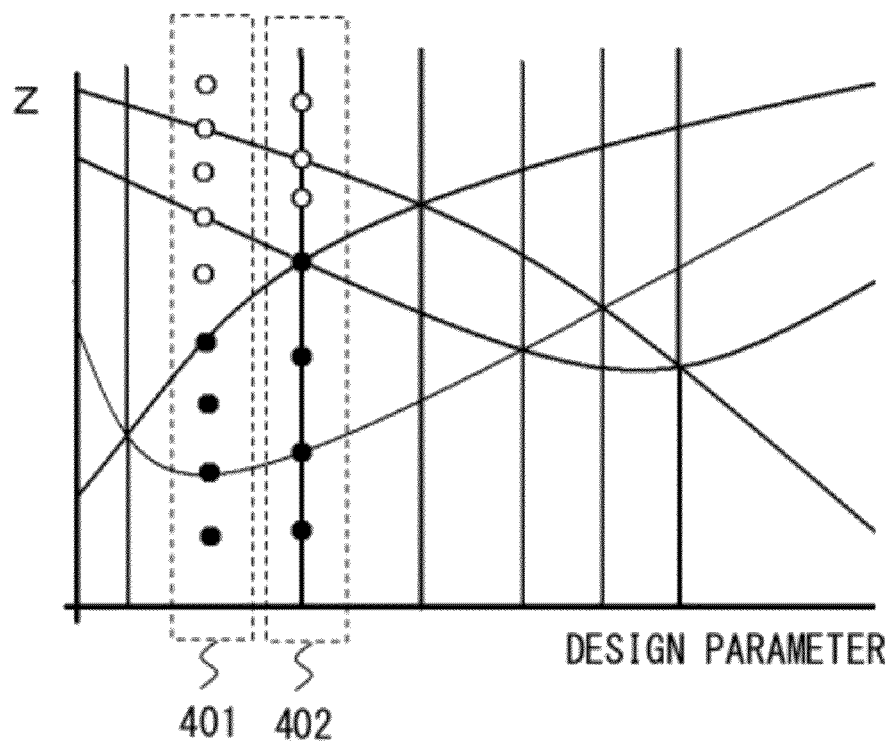
FIG. 4 is an explanatory view (1) of the operation according to an embodiment of the present invention.

Next, as illustrated as 401, 402, etc. in FIG. 4, the cell information about each cell corresponding to each sample point in which each value of the design parameters xt+1 through xk is fixed to one set, and only the value of the variable z changes, is stored in a list 2. Next, a piece of cell information in the list 2, for example a piece of information about any cell including a sample point whose design variable z has an intermediate value within the range of the variable z is selected. Then, by substituting each value of the design parameters xt+1 through xk corresponding to the sample point of the cell information and the value of the design variable z for the input logical expression (for example, equation (12)), it is evaluated whether or not the input logical expression is satisfied. If the input logical expression is satisfied, the cell information including the sample point is moved from the list 2 to a list 3.

In this case, the sample point satisfying the input logical expression for example corresponds to the point marked with a ● in FIG. 4, and indicates the minimum value or less in the design variables z of f1 and f2. Therefore, under the first restriction condition above, if a sample point satisfies the input logical expression, it can be determined that all other sample points in the list 2 having each of the same values of the design parameters xt+1 through xk as the sample point above and having values equal to or less than the design variable z of the sample point above as the values of the design variable z satisfy the input logical expression. That is, it is not necessary to evaluate the input logical expression for the other sample points. Therefore, each piece of cell information including each of the other sample points is moved from the list 2 to the list 3.

On the other hand, a sample point not satisfying the input logical expression for example corresponds to a point marked with a ○ in FIG. 4, and has the value of the design variable z which is larger than the minimum value in f1 and f2. Therefore, if the first restriction condition above is assumed, then unless the selected sample point satisfies the input logical expression, it is determined that the other sample points having values equal to or larger than the design variable z in the sample point as the values of the design variable z and having each of the same values of design parameters xt+1 through xk as the sample point do not satisfy the input logical expression. That is, it is not necessary to evaluate the input logical expression for the other sample points. Therefore, each piece of cell information including the other sample points and the selected sample point is not stored in the list 3, and is deleted from the list 2.

By confining the value of the design variable z to approaching the minimum value in f1 and f2 on the sample point having each of the same values of the design parameters xt+1 through xk as each piece of the cell information remaining in the list 2 while performing the two evaluations above, a cell information group satisfying the input logical expression can be obtained for a set of each value of the currently selected design parameters xt+1 through xk as the list 3.

Then, the above-mentioned process is repeatedly performed on all pieces of cell information in the list 1 while sequentially changing the set of each value of the design parameters xt+1 through xk.

Thus, if the input logical expression is satisfied on the sample point included in certain cell information for the set of each value of the same design parameters xt+1 through xk, then it will not be necessary to evaluate the input logical expression on the cell information including the other sample points having a value of the design variable z equal to or less than the value of the design variable z at the sample point. In addition, unless the input logical expression is satisfied for the sample point included in certain cell information for a set of each value of the same design parameters xt+1 through xk, then it will not be necessary to evaluate the input logical expression on the cell information including other sample points having the values of the design variable z equal to or larger than the value of the design variable z at the sample point. That is, the computational complexity can be considerably reduced in the QE/CAD calculating process by setting the first restriction condition above.

Next, in the present embodiment, as the second restriction condition, a range restriction is set to the value (value area) of the design variable z indicating a yield as illustrated as 501 in FIG. 5. That is, it is demanded that the yield be within a predetermined accuracy range such that one range of accuracy is required for the SNM and another is required for the WM. For example, in the SRAM design, a yield within a predetermined accuracy range is a generally requested design specification. Therefore, it is reasonable for the second restriction condition to be imposed as a design specification. It is not limited to the designing of the SRAM, but there are many design programs in which a range restriction is set in a value area as an objective function value.

Figure 6:
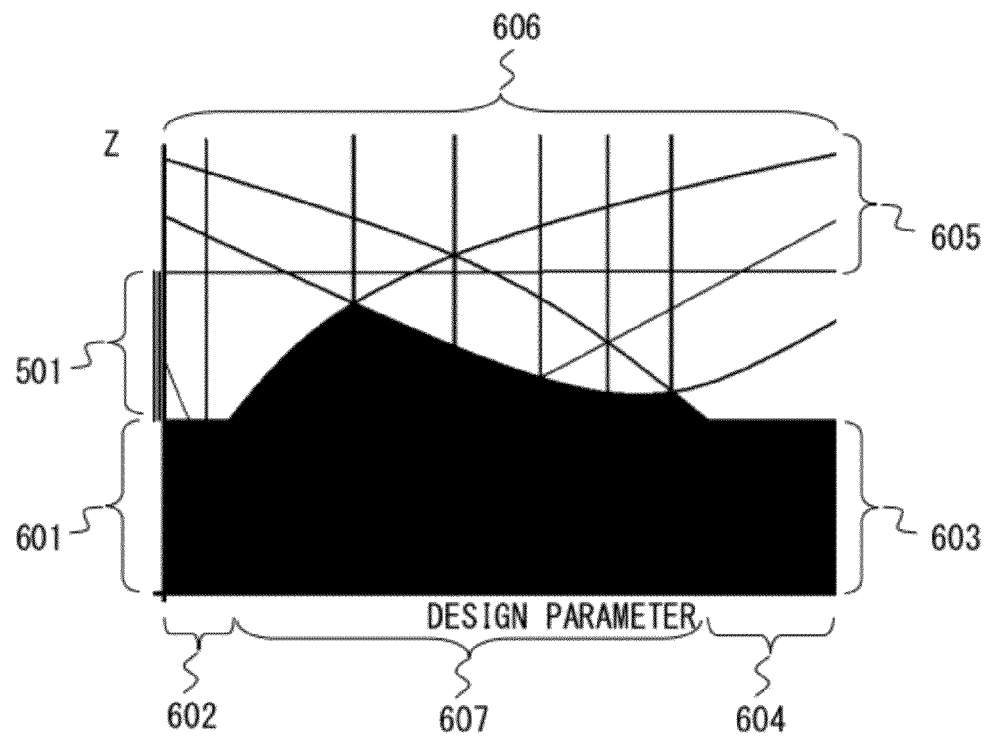
FIG. 6 is an explanatory view (3) of the operation according to an embodiment of the present invention.

In the present embodiment, the following process is performed with the above-mentioned second restriction condition taken into account. In each piece of cell information in the list 1, the cell information including a sample point in which the accuracy range of the value of the design variable z indicating a yield is larger than the upper limit of the accuracy range, for example indicated as 501 in FIG. 6 provided in advance as a design specification can be eliminated without an evaluation on the input logical expression. For example, in FIG. 6, the cell information corresponds to a cell included in the rectangular area enclosed by 605 and 606. Since the yield within this range is too high, the SNM and the WM can each be satisfied with a set of a design parameters, but it is rare for z to satisfy this value. If the restriction condition 1 is satisfied, this implies that there is a better design specification. On the other hand, in each piece of cell information in the list 1, since the cell information including a sample point in which the accuracy range of the design variable z is lower than the lower limit of the accuracy range, for example indicated as 501 in FIG. 6, provided in advance as a design specification is too low in yield, it cannot be selected as a set of design parameters. Therefore, the cell information can be added to the list 3 without an evaluation on the input logical expression. For example, in FIG. 6, the cell information corresponds to a cell included in rectangular area blackened and enclosed by 601 and 602, or a rectangular area blackened and enclosed by 603 and 604.

Thus, by setting the second restriction condition, the computational complexity can be considerably reduced in the QE/CAD calculating process.

As described above, a cell information group satisfying the input logical expression is finally obtained as the list 3. As described above, each piece of cell information includes a logical expression including an inequality or the like using one or more of the design parameters xt+1 through xk without a qualifier and the design variable z. Therefore, by combining and outputting the logical expression included in all cell information in the list 3, a logical expression equivalent to the input logical expression and including only the design parameters xt+1 through xk without a qualifier and the design variable z can be obtained.

Described below are the practical configuration and operation according to the present embodiment based on the above-mentioned basic concept.

Figure 2:
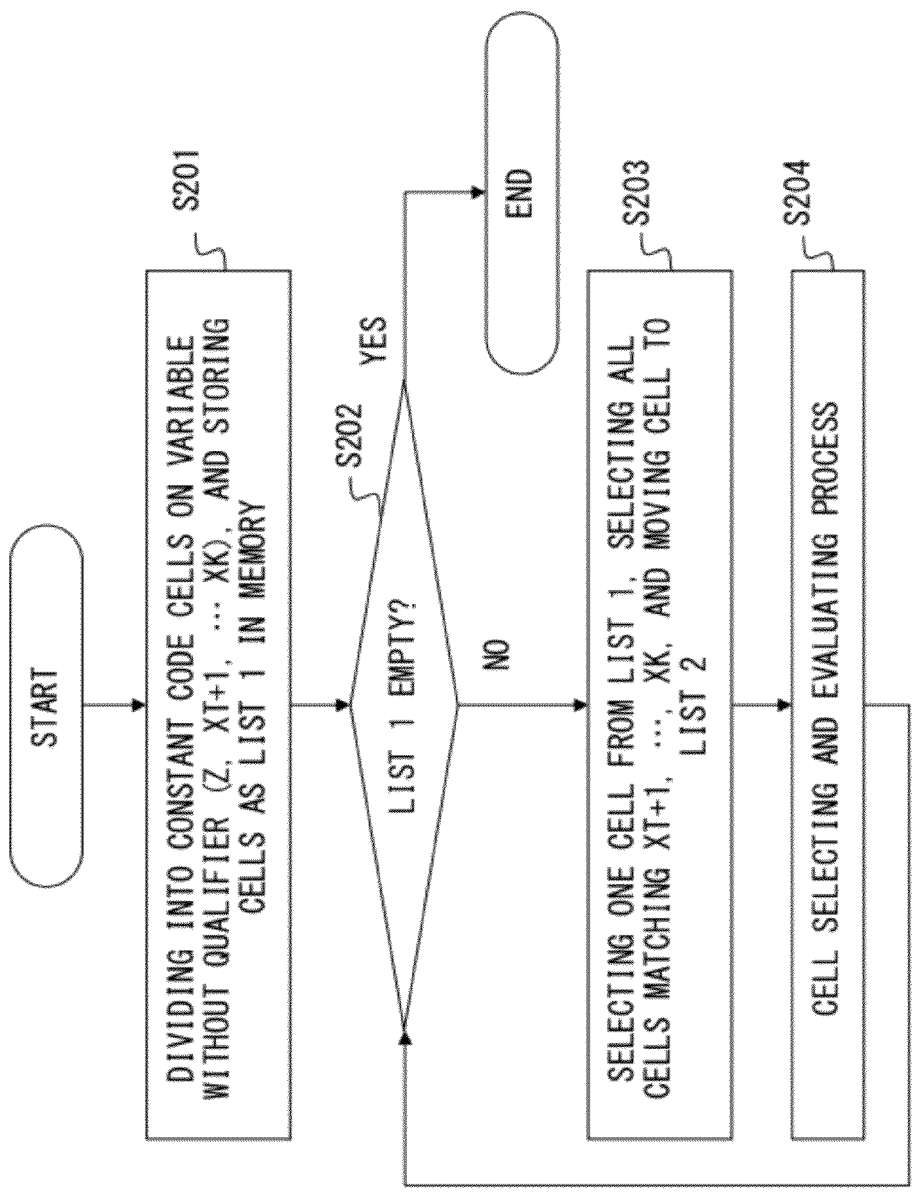
FIG. 2 is an operation flowchart of the controlling operation according to an embodiment of the present invention.
Figure 3:
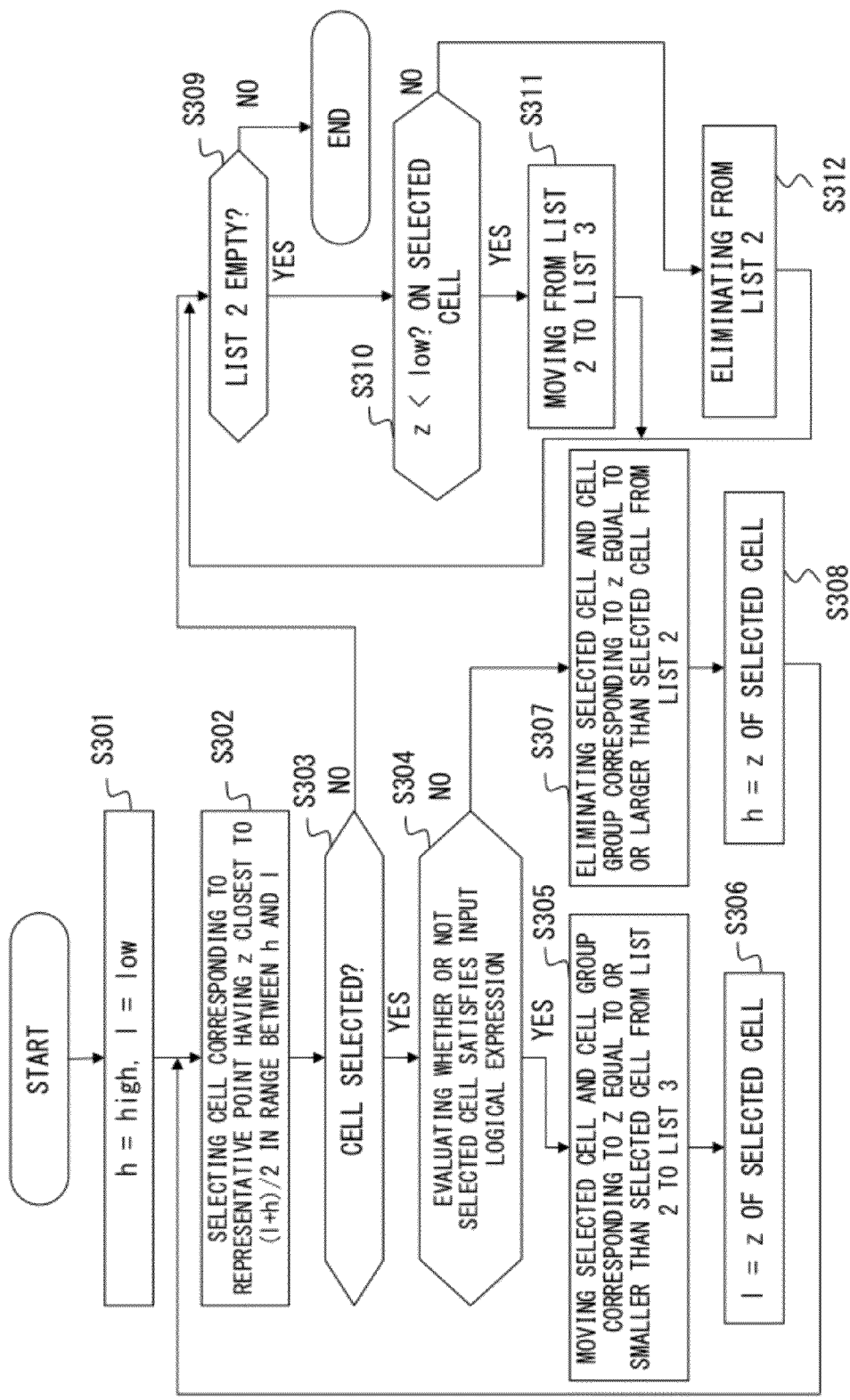
FIG. 3 is an operation flowchart of a cell selecting and evaluating process.

FIG. 1 is a configuration of an embodiment of the multi-objective optimization design support apparatus of an SRAM shape parameter. FIGS. 2 and 3 are operation flowcharts of the control operation according to the present embodiment. The present embodiment can be realized as a part of a design support device for performing a multi-objective optimizing process while inputting plural sets of design parameters relating to, for example, an SRAM shape and calculating each value of the objective functions of, for example, the SNM and the WM (or the HNM).

In FIG. 1, an objective function model expression generation unit 101 inputs a sample configured by a predetermined number of sets obtained by roughly dividing a definition area of each design parameter, and calculates an SNM objective function value and a WM objective function value through a simulator calculation. Using the input sample set of the design parameter and the SNM objective function value and the WM objective function value calculated for the set of samples, a mathematical approximation is respectively performed on the basis of linear regression analysis, thereby calculating an SNM objective function model expression and a WM objective function model expression.

Next, a logical-expression-with-qualifier generation unit 102 generates a logical expression including the specification of the definition area of each design parameter together with the SNM objective function model expression and the WM objective function model expression calculated by the objective function model expression generation unit 101. A practical format of the logical expression is expressed by, for example, equation (12) above. In this case, the first restriction condition in the form indicated by equation (11) above is added. In addition, a qualifier is added to the design parameters x1 through xt to be finally eliminated. Furthermore, the logical expression may include a function expression corresponding to the number of parameters in design such as Vth, leak current, power source voltage, etc. as necessary.

Next, a cell division unit 103 divides a design variable space configured by the design variable z and the design parameters xt+1 through xk without a qualifier into cells as a constant code area relating to f1-z, f2-z. The cell division unit 103 stores a logical expression representing each cell and stores the values of each of the design parameters xt+1 through xk and a value of the design variable z which correspond to the sample point of each cell as each piece of cell information in the list 1 (step S201 in FIG. 2).

Next, a piece of cell information is selected from the list 1, and the cell information group corresponding to each sample point having a set of each value of the design parameters xt+1 through xk matching the sample point of the cell information is retrieved from the list 1 and moved to the list 2 (step S203 in FIG. 2). That is, the cell information group (401 and 402 in FIG. 4) corresponding to the sample point group having a set of the values of the same design parameters xt+1 through xk is retrieved from the list 1, and the list 2 is generated. Each time the list 2 is generated, that is, for each piece of cell information corresponding to the sample point group having a set of each value of the same design parameters xt+1 through xk, the following cell selecting and evaluating process (step S204 in FIG. 2) is repeatedly performed by a first cell processing unit 104 and a second cell processing unit 105 illustrated in FIG. 1. The process is repeatedly performed until it is determined (step S202 in FIG. 2) that the list 1 has become empty (iterative process in steps S202→S203→S204→S5202 in FIG. 2).

The details of the process of the first cell processing unit 104 and the second cell processing unit 105 in FIG. 1 are illustrated in the operation flowchart in FIG. 3.

First, as a design specification, the upper limit high and the lower limit low of the accuracy range are input with respect to the design variable z indicating a yield, and are respectively set as the current upper limit h and the current lower limit l (step S301 in FIG. 3).

Then, the first cell processing unit 104 performs a series of processes from steps S302 through S308 in FIG. 3.

That is, first, an arbitrary piece of cell information corresponding to the sample point having the value of the design variable z closest to "(h+1)/2" within the range of the current upper limit h and the current lower limit l is selected from the list 2 generated in step S203 in FIG. 2 (step S302 in FIG. 3).

Next, it is determined whether or not the cell information has been selected in step S302 (step S303 in FIG. 3).

If the cell information has been selected and the determination in step S303 is YES, each value of the design parameters xt+1 through xk corresponding to the sample point of the cell information selected in step S302 and the design variable z are acquired from the list 2. Then, it is evaluated whether or not an input logical expression is satisfied by substituting the acquired values for the input logical expression (for example, equation (12)) generated by the logical-expression-with-qualifier generation unit 102 in FIG. 1 (step S304 in FIG. 3).

If the input logical expression is satisfied and the determination in step S304 is YES, then the cell information including the sample point and the cell information group corresponding to each sample point having a design variable z that has a value equal to lower than the design variable z of the sample point are moved from the list 2 to the list 3 (step S305 in FIG. 3). Afterwards, the cell information including the sample point having a design variable z that has a value equal to or lower than the design variable z of the sample point does not exist in the list 2, and it is not necessary to search within the range of values equal to or lower than the design variable z of the sample point. Therefore, the value of the design variable z is set to the current lower limit l (step S306 in FIG. 3).

On the other hand, if the input logical expression is not satisfied and the determination in step S304 is NO, then the cell information including the sample point, and the cell information group corresponding to each sample point having a design variable z that has a value equal to or larger than the design variable z of the sample point, are deleted from the list 2 (step S307). These pieces of cell information are not entered into the list 3. Afterwards, the cell information including the sample point having a design variable z that has a value equal to or larger than the value of the design variable z of the sample point does not exist in the list 2, and it is not necessary to search within the range equal to or higher than the value of the design variable z. Therefore, the value of the design variable z is set to the current upper limit h (step S308 in FIG. 3).

After the process in step S307 or 5308, an arbitrary piece of cell information corresponding to the sample point having a design variable z value closest to "(h+1)/2" within the range of the current upper limit h and the current lower limit l, which are newly set, is selected from the updated list 2 (step S302 in FIG. 3). Then, a series of processes in steps S302 through S308 as described above are repeatedly performed.

As a result of the above-mentioned process performed by the first cell processing unit 104 in FIG. 1, when there is no cell information selected from the list 2 within the range of the current upper limit h and the current lower limit l and the determination in step S303 is NO, then the cell information corresponding to the possible area blackened in the rectangular range enclosed by 501 and 607 in FIG. 6, for example, is obtained in the list 3.

Next, the second cell processing unit 104 in FIG. 1 performs a series of processes from steps S309 through S312.

That is, first, it is determined whether or not the list 2 is empty (step S309 in FIG. 3).

If the list 2 is not empty, that is, if the determination in step S309 is NO, then an arbitrary piece of cell information is selected from the list 2, and it is determined whether or not the value of the design variable z of the sample point of the selected cell information is smaller than the lower limit low of the design variable z of the yield input as the design specification in step S301 (step S310 in FIG. 3).

If the determination in step S310 is YES, the selected cell information satisfies the first restriction condition in the input logical expression, and the information can be added to the list 3 without an evaluation of the input logical expression. Therefore, the cell information is moved from the list 2 to the list 3 (step S311 in FIG. 3). For example, in FIG. 6, the cell information corresponds to the cell included in the possible black rectangular area enclosed by 601 and 602 or the possible black rectangular area enclosed by 603 and 604.

On the other hand, if the determination in step S310 is NO, the selected cell information does not satisfy the first restriction condition in the input logical expression. Therefore, the cell information can be deleted from the list 2 without an evaluation of the input logical expression. Accordingly, the cell information is deleted from the list 2 (step S312 in FIG. 3). For example, in FIG. 6, the cell information corresponds to the cell included in the rectangular area enclosed by 605 and 606.

After the process in steps S311 or S312, control is returned to step S309, and similar processes are repeated until the list 2 becomes empty and the determination in step S309 is YES.

As described above, the cell selecting and evaluating process in step S204 in FIG. 2 illustrated in the operation flowchart in FIG. 3 is repeatedly performed until the list 1 becomes empty. Finally, when the list 1 becomes empty and the determination in step S202 in FIG. 2 is YES, a cell information group satisfying the input logical expression is finally obtained as the list 3. As described above, each piece of cell information is represented by a logical expression including an inequality or the like using one or more of the design parameters xt+1 through xk without a qualifier and the design variable z. Therefore, by combining and outputting the logical expression included in all cell information in the list 3, a logical expression equivalent to the input logical expression and including only the design parameters xt+1 through xk without a qualifier and the design variable z is output, thereby terminating the process of the present embodiment.

The following equation indicates an example of a logical expression as an output result, and is a logical expression including only the design parameters x1 and x2 without a qualifier and the design variable z.

$$0 \leq x1 \leq 1 \text{ and } 0 \leq x2 \leq 1 \text{ and}$$
$$102583000765266535220745370800000z+$$
$$145391834284298557351912012800000*x2+$$
$$178719641791338681952469310240000*x1-$$
$$5538137108629\ 51779525994467095553 \leq 0$$

The relationship between the design parameters x1 and x2 and the design variable z indicating the yield can be easily obtained by sequentially inputting a set of the values of the design parameters x1 and x2, calculating the logical expression, and drawing it on the display or the like.

FIG. 7 is an example of a configuration of the hardware of a computer capable of realizing a system according to the embodiment illustrated in FIG. 1.

The computer illustrated in FIG. 7 includes a CPU 701, memory 702, an input device 703, an output device 704, an external storage device 705, a portable record medium drive 706 into which a non-transitory computer-readable recording medium 709 is inserted, and a network connection device 707, and has a configuration in which these components are interconnected to one another via a bus 708. The configuration illustrated in FIG. 7 is an example of a computer capable of realizing the system, but the computer is not limited to the configuration.

The CPU 701 performs the control of the entire computer. The memory 702 can be a memory such as RAM etc. for temporarily storing a program or data stored in the external storage device 705 (or the non-transitory computer-readable recording medium 709) when the program is executed, data is updated, etc. The CPU 701 controls the entire system by reading the program to the memory 702 and executing the program.

The input device 703 is configured by, for example, a keyboard, a mouse, etc., and an interface control device for them. The input device 703 detects an inputting operation via a keyboard, a mouse, etc. by a user, and notifies the CPU 701 of the detection result.

The output device 704 is configured by a display device, a printer device, or the like, and an interface control device for them. The output device 704 outputs the data transmitted by the control of the CPU 701 to a display device and a print device.

The external storage device 705 is, for example, a hard disk storage device, and is mainly used in storing various data and programs.

The portable record medium drive 706 accommodates the non-transitory computer-readable recording medium 709, which is for example an optical disk, SDRAM, Compact-Flash, or the like, and supports the external storage device 705.

The network connection device 707 connects the communication line of, for example, a LAN (local area network) or a WAN (wide area network).

The system according to the present embodiment is realized by the CPU 701 executing the program loaded with the above-mentioned function illustrated in FIGS. 1 through 3. The program may, for example, be distributed after recording it on the external storage device 705 and the non-transitory computer-readable recording medium 709, or may be acquired by the network connection device 707 over a network.

According to an embodiment of the present invention, when an input logical expression is satisfied with respect to a sample point included in apiece of cell information for each value of the same design parameter, it is not necessary to evaluate the input logical expression for cell information including other sample points having a value equal to or lower than a value of a predetermined variable indicating the yield etc. at the above-mentioned sample point as the value of a predetermined variable. In addition, if an input logical expression is not satisfied for a sample point included in a piece of cell information for each value of the same design parameter, it is not necessary to evaluate an input logical expression with respect to the cell information including other sample points having a value equal to or larger than the value of a predetermined variable at the above-mentioned sample point as the value of a predetermined variable. As a result, the computational complexity can be considerably reduced in the QE/CAD calculating process.

All examples and conditional language recited herein are intended for pedagogical-purposes to aid the reader in understanding the invention and the concepts contributed by the inventor to furthering the art, and are to be construed as being without limitation to such specifically recited examples and conditions, not does the organization of such examples in the specification relate to a showing of the superiority and inferiority of the invention. Although the embodiments of the present invention have been described in detail, it should be understood that the various changes, substitutions, and alterations could be made hereto without departing from the spirit and scope the invention.

What is claimed is:

1. A multi-objective optimization design support apparatus which supports a determination of a set of optimum design parameters by inputting plural sets of design parameters, calculating a plurality of objective functions using a specific calculation, and performing a multi-objective optimizing process on the plurality of objective functions, the apparatus comprising:

a processor to perform processes of:

calculating a set of plural objective functions for a set of samples of a specific number of sets of design parameters, and generating a plurality of objective function model expressions by representing each of the objective functions as a mathematical approximation using the set of samples of the specific number of sets of the design parameters and the set of plural objective functions calculated corresponding to the set of samples;

generating an input logical expression for which a definition area of each of the design parameters, and a range restriction wherein a value of a specific design variable corresponding to a value of each of the objective functions is equal to or smaller than a minimum value of a plurality of objective function values calculated by the plurality of objective function model expressions are specified, and in which a qualifier is specified for a design parameter to be eliminated by a designer;

dividing a design variable space formed by the specific design variable in the input logical expression and a design parameter for which no qualifier is specified into cell areas whose codes are constant with respect to a difference between each of the objective function model expression groups and the specific design variable, and storing in a list 1 a logical expression expressing the cell area via the specific design variable and via a design parameter for which the qualifier is not specified and storing in a list 1 cell information including a value of the specific design variable corresponding to a sample point selected from the cell area and including a value of a design parameter for which the qualifier is not specified;

moving from the list 1 to a list 2 cell information including a sample point in which values of design parameters for which the qualifier is not specified are the same, and then performing a calculation by substituting a sample point included in the selected cell information for the input logical expression while selecting the cell information piece by piece from the list 2, thereby evaluating whether or not the sample point satisfies the input logical expression, moving from the list 2 to a list 3 the selected cell information and cell information including a sample point having a specific design variable of a value equal to or smaller than the specific design variable corresponding to a sample point included in the selected cell information, when the input logical expression is satisfied, repeatedly performing a series of processes of eliminating from the list 2 the selected cell information and cell information including a sample point having a specific design variable of a value equal to or larger than the specific design variable corresponding to the sample point included in the selected cell information until the list 2 is empty when the input logical expression is not satisfied, and repeatedly performing a moving process from the list 1 to the list 2 each time the list 2 is empty until the list 1 is empty, wherein a logical expression obtained by combining each logical expression included in each piece of finally obtained cell information in the list 3 is output as a logical expression which is equivalent to the input logical expression and includes only a design parameter without the qualifier and the specific design variable, and design support is performed while presenting a relationship between the design parameter without the qualifier and the specific design variable using the output logical expression.

2. The apparatus according to claim 1, wherein the processor further performs processes of:

moving cell information included in the list 2 from the list 2 to the list 3 when a value of the specific design variable corresponding to a sample point included in the cell information is smaller than a lower limit of the specific design variable input as a design specification, and eliminating the cell information from the list 2 when the value of the specific design variable corresponding to the sample point included in the cell information is larger than an upper limit of the specific design variable input as the design specification.

3. A multi-objective optimization design supporting method causing a computer to support a determination of a set of optimum design parameters by inputting plural sets of design parameters, calculating a plurality of objective functions using a specific calculation, and performing a multi-objective optimizing process on the plurality of objective functions, the method comprising:

calculating, by the computer, a set of plural objective functions for a set of samples of a specific number of sets of design parameters, and generating, by the computer, a plurality of objective function model expressions by representing each of the objective functions as a mathematical approximation using the set of samples of the specific number of sets of the design parameters and the set of plural objective functions calculated corresponding to the set of samples;

generating, by the computer, an input logical expression for which a definition area of each of the design parameters, and a range restriction wherein a value of a specific design variable corresponding to a value of each of the objective functions is equal to or smaller than a minimum value of a plurality of objective function values calculated by the plurality of objective function model expressions are specified, and in which a qualifier is specified for a design parameter to be eliminated by a designer;

dividing, by the computer, a design variable space formed by the specific design variable in the input logical expression and a design parameter for which no qualifier is specified into cell areas whose codes are constant with respect to a difference between each of the objective function model expression groups and the specific design variable, and storing, by the computer, in a list 1 a logical expression expressing the cell area via the specific design variable and via a design parameter for which the qualifier is not specified and storing, by the computer, in a list 1 cell information including a value of the specific design variable corresponding to a sample point selected from the cell area and including a value of a design parameter for which the qualifier is not specified; and moving, by the computer, from the list 1 to a list 2 cell information including a sample point in which values of design parameters for which the qualifier is not specified are the same, and then performing, by the computer, a calculation by substituting a sample point included in the selected cell information for the input logical expression while selecting the cell information piece by piece from the list 2, thereby evaluating, by the computer, whether or not the sample point satisfies the input logical expression, moving, by the computer, from the list 2 to a list 3 the selected cell information and cell information including a sample point having a specific design variable of a value equal to or smaller than the specific design variable corresponding to a sample point included in the selected cell information when the input logical expression is satisfied, repeatedly performing, by the computer, a series of processes of eliminating from the list 2 the selected cell information and cell information including a sample point having a specific design variable of a value equal to or larger than the specific design variable corresponding to the sample point included in the selected cell information until the list 2 is empty when the input logical expression is not satisfied, and repeatedly performing, by the computer, a moving process from the list 1 to the list 2 each time the list 2 is empty until the list 1 is empty, wherein a logical expression obtained by combining each logical expression included in each piece of finally obtained cell information in the list 3 is output as a logical expression which is equivalent to the input logical expression and includes only a design parameter without the qualifier and the specific design variable, and design support is performed while presenting a relationship between the design parameter without the qualifier and the specific design variable using the output logical expression.

4. The method according to claim 3, further comprising:

moving, by the computer, cell information included in the list 2 from the list 2 to the list 3 when a value of the specific design variable corresponding to a sample point included in the cell information is smaller than a lower limit of the specific design variable input as a design specification, and eliminating, by the computer, the cell information from the list 2 when the value of the specific design variable corresponding to the sample point included in the cell information is larger than an upper limit of the specific design variable input as the design specification.

5. A non-transitory computer-readable recording medium storing a program used to direct a computer to support a determination of a set of optimum design parameters by inputting plural sets of design parameters, calculating a plurality of objective functions using a specific calculation, and performing a multi-objective optimizing process on the plurality of objective functions, the program comprising:

an objective function model expression generation module calculating a set of plural objective functions for a set of samples of a specific number of sets of design parameters, and generating a plurality of objective function model expressions by representing each of the objective functions as a mathematical approximation using the set of samples of the specific number of sets of the design parameters and the set of plural objective functions calculated corresponding to the set of samples;

a logical-expression-with-qualifier generation module generating an input logical expression for which a definition area of each of the design parameters, and a range restriction wherein a value of a specific design variable corresponding to a value of each of the objective functions is equal to or smaller than a minimum value of a plurality of objective function values calculated by the plurality of objective function model expressions are specified, and in which a qualifier is specified for a design parameter to be eliminated by a designer;

a cell division module dividing a design variable space formed by the specific design variable in the input logical expression and a design parameter for which no qualifier is specified into cell areas whose codes are constant with respect to a difference between each of the objective function model expression groups and the specific design variable, and storing in a list 1 a logical expression expressing the cell area via the specific design variable and via a design parameter for which the qualifier is not specified and storing in a list 1 cell information including a value of the specific design variable corresponding to a sample point selected from the cell area and including a value of a design parameter for which the qualifier is not specified; and a first cell processing module moving from the list 1 to a list 2 cell information including a sample point in which values of design parameters for which the qualifier is not specified are the same, and then performing a calculation by substituting a sample point included in the selected cell information for the input logical expression while selecting the cell information piece by piece from the list 2, thereby evaluating whether or not the sample point satisfies the input logical expression, moving from the list 2 to a list 3 the selected cell information and cell information including a sample point having a specific design variable of a value equal to or smaller than the specific design variable corresponding to a sample point included in the selected cell information when the input logical expression is satisfied, repeatedly performing a series of processes of eliminating from the list 2 the selected cell information and cell information including a sample point having a specific design variable of a value equal to or larger than the specific design variable corresponding to the sample point included in the selected cell information until the list 2 is empty when the input logical expression is not satisfied, and repeatedly performing a moving process from the list 1 to the list 2 each time the list 2 is empty until the list 1 is empty, wherein a logical expression obtained by combining each logical expression included in each piece of finally obtained cell information in the list 3 is output as a logical expression which is equivalent to the input logical expression and includes only a design parameter without the qualifier and the specific design variable, and design support is performed while presenting a relationship between the design parameter without the qualifier and the specific design variable using the output logical expression.

6. The non-transitory computer-readable recording medium according to claim 5, the program further comprising:

a second cell processing module moving cell information included in the list 2 from the list 2 to the list 3 when a value of the specific design variable corresponding to a sample point included in the cell information is smaller than a lower limit of the specific design variable input as a design specification, and eliminating the cell information from the list 2 when the value of the specific design variable corresponding to the sample point included in the cell information is larger than an upper limit of the specific design variable input as the design specification.

* * * * *